(12) United States Patent
Komatsubara et al.

(10) Patent No.: US 11,132,467 B2
(45) Date of Patent: Sep. 28, 2021

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Minato-ku (JP)

(72) Inventors: Yoshihiro Komatsubara, Kawasaki (JP); Shinya Takumi, Kawasaki (JP); Yoshikazu Hanatani, Komae (JP); Jun Kanai, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 323 days.

(21) Appl. No.: 16/286,777

(22) Filed: Feb. 27, 2019

(65) Prior Publication Data
US 2020/0089914 A1  Mar. 19, 2020

(30) Foreign Application Priority Data

Sep. 18, 2018 (JP) .............................. JP2018-173750

(51) Int. Cl.
*G06F 21/00* (2013.01)
*G06F 21/64* (2013.01)
(Continued)

(52) U.S. Cl.
CPC .......... *G06F 21/64* (2013.01); *G06F 9/30189* (2013.01); *G06F 21/54* (2013.01)

(58) Field of Classification Search
CPC ...... G06F 21/64; G06F 21/54; G06F 9/30189; G06F 21/00; G06F 21/10; G06F 21/50;
(Continued)

(56) References Cited

U.S. PATENT DOCUMENTS

| 10,846,394 B2 * | 11/2020 | Ogura ..................... G06F 21/57 |
| 2014/0007228 A1 * | 1/2014 | Ngair ...................... G06F 21/56 726/22 |

(Continued)

FOREIGN PATENT DOCUMENTS

| JP | 2005-157429 A | 6/2005 |
| JP | 2009-259160 | 11/2009 |

(Continued)

OTHER PUBLICATIONS

Masanobu Koike, et al., "Development of WhiteEgret™: A Whitelisting-type Execution Control on Linux" Computer Security Symposium 2017, Oct. 23-25, 2017, pp. 1317-1323 (with English machine translation).

*Primary Examiner* — Josnel Jeudy
(74) *Attorney, Agent, or Firm* — Oblon, McClelland, Maier & Neustadt, L.L.P.

(57) ABSTRACT

According to an embodiment, an information processing device includes a prior verifying unit, and an execution control unit. The prior verifying unit is configured to verify integrity of software registered in a whitelist at a timing which does not depend on an execution start of software and generate an execution permission list in which software which is successfully verified is registered as execution-permitted software. The execution control unit is configured to permit execution of the software if the software is registered in the execution permission list as the execution-permitted software when the execution start of the software is detected.

16 Claims, 13 Drawing Sheets

(51) Int. Cl.
*G06F 9/30* (2018.01)
*G06F 21/54* (2013.01)

(58) Field of Classification Search
CPC ..... G06F 21/60; H04W 12/00; H04W 12/001; H04W 12/06
USPC .......................................................... 726/26
See application file for complete search history.

(56) References Cited

U.S. PATENT DOCUMENTS

| | | | |
|---|---|---|---|
| 2014/0075187 A1* | 3/2014 | Fanton | G06F 21/53 713/165 |
| 2016/0323106 A1* | 11/2016 | Roper | G06F 21/51 |
| 2017/0315793 A1* | 11/2017 | Kanematsu | G06F 21/121 |
| 2018/0081830 A1* | 3/2018 | Kaplan | G06F 12/1009 |
| 2019/0065735 A1 | 2/2019 | Ogura et al. | |
| 2019/0073471 A1 | 3/2019 | Haruki et al. | |
| 2019/0080059 A1 | 3/2019 | Takumi et al. | |
| 2019/0080080 A1 | 3/2019 | Ogura et al. | |
| 2019/0286833 A1 | 9/2019 | Takumi et al. | |

FOREIGN PATENT DOCUMENTS

| | | |
|---|---|---|
| JP | 2012-185745 A | 9/2012 |
| JP | 2014-48866 | 3/2014 |
| JP | 2015-176278 A | 10/2015 |
| JP | 2016-181074 A | 10/2016 |
| JP | 2017-4334 A | 1/2017 |
| JP | 2018-106634 A | 7/2018 |
| JP | 2019-40256 A | 3/2019 |
| JP | 2019-46266 A | 3/2019 |
| JP | 2019-49877 A | 3/2019 |
| JP | 2019-50507 A | 3/2019 |
| JP | 2019-159830 A | 9/2019 |
| WO | WO 2011/030455 A1 | 3/2011 |

\* cited by examiner

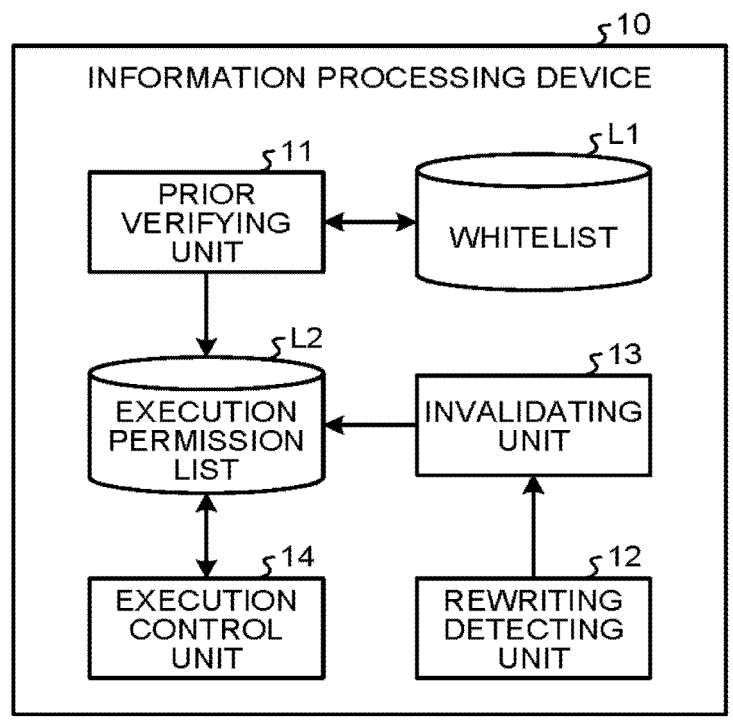

| FILE PATH | HASH VALUE | PRIOR VERIFICATION FLAG |
|---|---|---|
| /bin/test1 | abcd··· | 1 |
| /bin/test2 | aaaa··· | 1 |
| /sbin/test3 | 1234··· | 0 |
| ⋮ | ⋮ | ⋮ |

FIG.8

| FILE PATH | HASH VALUE |
|---|---|
| /sbin/test3 | 1234··· |
| ⋮ | ⋮ |

| FILE PATH | HASH VALUE | VERIFIED FLAG |
|---|---|---|
| /bin/test1 | abcd⋯ | 1 |
| /bin/test2 | aaaa⋯ | 1 |
| /sbin/test3 | 1234⋯ | 0 |
| ⋮ | ⋮ | ⋮ |

L2'

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-173750, filed on Sep. 18, 2018; the entire contents of which are incorporated herein by reference.

FIELD

Embodiments described herein relate generally to an information processing device, an information processing method, and a computer program product.

BACKGROUND

For example, with an increase in cases of attacks on control systems of important infrastructure, it is required to restrict software used in a system and secure safety of a system. As a technique for restricting software used in a system, there is a whitelist type execution control technique of permitting only execution of predetermined software. A whitelist is a list in which software used in a system is registered in advance, and stores a set of file information of software permitted to be executed and a hash value of the software. At the time of operation of the system, a hash value of software is calculated when execution of software starts, verification of integrity is performed by collating the calculated hash value with the hash value (reference value) of the software registered in the whitelist, only execution of software which is successfully verified is permitted, so that use restriction of the software is realized. As a method of verifying the integrity of software, in addition to the method using a hash value of software, a method of performing signature verification or the like has been also proposed.

In the whitelist type execution control technique of the related art, verification of the integrity is performed using a hash value or a signature of software when execution of software is started, and thus a calculation for verification occurs each time execution of software is started. For this reason, a processing delay is likely to occur in a system being operated, and improvements are required.

BRIEF DESCRIPTION OF THE DRAWINGS

FIG. 1 is a block diagram illustrating a functional configuration example of an information processing device;

FIG. 2 is a diagram illustrating an example of a whitelist;

FIG. 8 is a diagram illustrating an example of a to-be-verified list;

FIG. 11 is a flowchart illustrating an example of an execution permission list;

DETAILED DESCRIPTION

Figure 3:
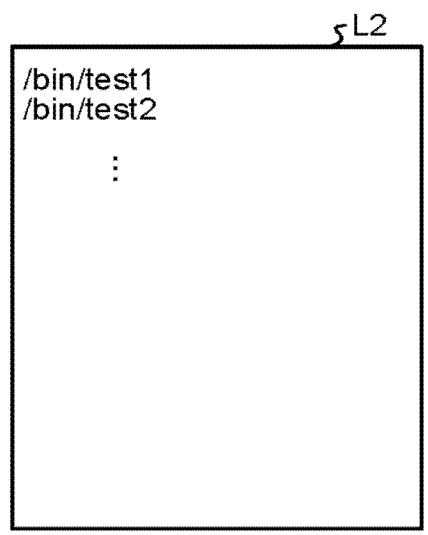
FIG. 3 is a diagram illustrating an example of an execution permission list.

According to an embodiment, an information processing device includes a prior verifying unit, and an execution control unit. The prior verifying unit is configured to verify integrity of software registered in a whitelist at a timing which does not depend on an execution start of software and generate an execution permission list in which software which is successfully verified is registered as execution-permitted software. The execution control unit is configured to permit execution of the software if the software is registered in the execution permission list as the execution-permitted software when the execution start of the software is detected.

An information processing device, an information processing method, and a computer program product according to embodiments will be described below in detail with reference to the appended drawings.

OVERVIEW OF EMBODIMENT

An information processing device of the present embodiment is realized as a functional module which performs whitelist type execution control in various types of systems designed in accordance with various purposes. In the whitelist type execution control of the related art, when execution of software registered in a whitelist is started, verification of the integrity of the software is performed, and in a case in which the verification is successfully performed, execution of the software is permitted. For this reason, a processing delay is likely to occur in a system being operated, and thus it is difficult to apply it to systems in which a delay is not allowed.

On the other hand, in an information processing device of the present embodiment, integrity of software registered in a whitelist is verified at a timing which does not depend on an execution start of software. Then, an execution permission list in which software which is successfully verified is registered as execution-permitted software is generated, and the execution permission list is held while a system is being operated. Thereafter, when the execution start of the software is detected, execution of the software is permitted if the software is registered in the execution permission list as the execution-permitted software with reference to the execution permission list.

As described above, the information processing device of the present embodiment can perform the verification of the integrity of software which is high in a processing load and incurs a delay in advance and determine whether or not the software is executed with reference to the execution permission list when the execution of the software is started. Therefore, it is possible to secure safety of a system by whitelist type execution control while effectively suppressing the occurrence of delay caused by the execution start of software.

Further, as software in the present embodiment, mainly, a program stored in an executable file format is assumed but may be a file such as data which is referred to by a program. For the file such as data which is referred to by a program, referring to the file corresponds to executing the software.

The whitelist in the present embodiment is a list in which software permitted to be used in a system is registered in advance, and a set of file information and a hash value of the software is stored in each entry. Here, the file information is information identifying a file of the software, and is, for example, a file path indicating a path to access the file. In the following description, file information of software is assumed to be a file path, but other information identifying a file, for example, a combination of an inode number and a device number or the like may be used. Further, registering software in a whitelist or an execution permission list means storing at least file information of software in an entry of the list.

First Embodiment

FIG. 1 is a block diagram illustrating a functional configuration example of an information processing device 10 according to a first embodiment. The information processing device 10 of the present embodiment comprises a prior verifying unit 11, a rewriting detecting unit 12, an invalidating unit 13, and an execution control unit 14 as illustrated in FIG. 1.

If a verification execution event is detected, the prior verifying unit 11 verifies the integrity of software registered in a whitelist L1. Then, the prior verifying unit 11 generates an execution permission list L2 in which successfully verified software is registered as execution-permitted software.

Here, the verification execution event is an event which decides a timing to perform the verification of the integrity of the software registered in the whitelist and is decided in advance. For example, a process an activation start of the information processing device 10 of the present embodiment or a system including the information processing device 10, an activation start of specific software, reception of a specific signal from the outside, or the like can be set as the verification execution event. For example, the specific software is verification software executed at an arbitrary timing by a system administrator. Further, transition of a system to an unsteady operation such as maintenance mode, detection of a low usage of hardware resources (a low processing load), an event in which it becomes a time zone assumed to be low in a usage of hardware resources, or the like can be set as the verification execution event. Further, an administrator command which the system administrator can execute with an arbitrary timing may be decided, and issuance of the administrator command may be set as the verification execution event. A timing at which these verification execution events are detected, that is, a timing at which the prior verifying unit 11 performs the verification of the integrity of the software registered in the whitelist L1 is a timing that does not depend on the execution start of software being operated in the system.

FIG. 2 is a diagram illustrating an example of the whitelist L1. For example, as illustrated in FIG. 2, a set of a file path and a hash value of software is stored in whitelist L1 for each piece of software permitted to be used in a system. The hash value is a pre-calculated value and is used as a reference value when the integrity of software is verified. For example, the whitelist L1 is stored as a file in a storage device and is read out by the prior verifying unit 11.

The prior verifying unit 11 acquires a file on the basis of the file path of software registered in the whitelist L1 and calculates a hash value from the acquired file. Then, when the calculated hash value coincides with the hash value of the whitelist L1 (that is, when the integrity is successfully verified), the software is registered in the execution permission list L2 as the execution-permitted software.

FIG. 3 is a diagram illustrating an example of the execution permission list L2. For example, as illustrated in FIG. 3, a file path of software whose integrity is successfully verified by the prior verifying unit 11 is stored in the execution permission list L2. In the present embodiment, the software with the file path stored in the execution permission list L2 is software registered in the execution permission list L2 as the execution-permitted software. The execution permission list L2 is held in, for example, a RAM or the like.

The rewriting detecting unit 12 detects rewriting of software. The rewriting of software can be detected by monitoring, for example, writing to a file or the like.

In a case in which the rewriting of software is detected by the rewriting detecting unit 12, the invalidating unit 13 checks whether or not the software is registered in the execution permission list L2 as the execution-permitted software. Then, in a case in which the software whose rewriting is detected is registered in the execution permission list L2 as the execution-permitted software, registration of the software as the execution-permitted software is invalidated.

To invalidate the registration as the execution-permitted software, for example, it is desirable to delete an entry in which the file path of the software is stored from the execution permission list L2. Further, the registration as the execution-permitted software may be invalidated by adding a flag indicating valid/invalid registration to each entry of the execution permission list L2 and rewriting the flag from a valid value (for example, "1") to an invalid value (for example, "0").

Further, when a flag is used for the invalidation of the registration as the execution-permitted software, a flag of software which fails in the verification of the integrity by the prior verifying unit 11 may be also set to an invalid value and then registered in the execution permission list L2.

Further, the prior verifying unit 11 may set flags of all the entries of the whitelist L1 to an invalid value when the verification execution event is detected and then register it in the execution permission list L2. The execution permission list L2 may be generated by adding a flag set to the invalid value to each entry of the whitelist L1 and copying the whitelist L1 by the prior verifying unit 11 when the verification execution event is detected.

As the flag used for the invalidation of the registration as the execution-permitted software, a value indicating that execution prohibition is performed without verifying execution of software or a value indicating that a flag is not set to a valid value even when software is successfully verified may be set. In a case in which rewriting of software is detected, the invalidating unit 13 may change a flag assigned to an entry of software whose rewriting is detected to a value indicating that execution prohibition is performed without verifying execution of software or a value indicating that a flag is not set to a valid value even when software is successfully verified.

When an execution start of software is detected, the execution control unit 14 controls the execution of the software on the basis of whether or not the software is registered in the execution permission list L2 as the execution-permitted software. For example, the execution control unit 14 extracts a file path of software whose execution start is detected, and permits execution of software whose execution start is detected when the file path coincides with any one of the file paths stored in the execution permission list L2 (when a value of the flag is a valid value in a case in which the above-described flag is added). On the other hand, when the file path extracted from the software whose execution start is detected does not coincide with any file path in the execution permission list L2, the execution of the software is declined. In a case in which the execution of the software whose execution start is detected is declined, it is desirable for the execution control unit 14 to output an alert indicating the occurrence of an abnormality.

Further, in a case in which the software whose execution start is detected is not registered in the execution permission list L2 as the execution-permitted software or in a case in which the flag is set to the invalid value and registered, the execution control unit 14 may perform verification of the integrity of the software by a method similar to that of the prior verifying unit 11 and permit the execution of the software if the verification is successfully performed. Further, at this time, software which is successfully verified may be registered in the execution permission list L2 as the execution-permitted software.

Further, in a case in which the software whose execution start is detected is not registered in the execution permission list L2 as the execution-permitted software, the execution control unit 14 may output an alert indicating the occurrence of an abnormality, transition to an abnormal mode in which some functions of the system are restricted, and then permit the execution of the software. At this time, transition from the abnormal mode to a normal mode may be performed in accordance with a predetermined manipulation by a system administrator, or the execution of software whose execution start is detected may be permitted under condition of a predetermined manipulation by a system administrator.

Figure 4:
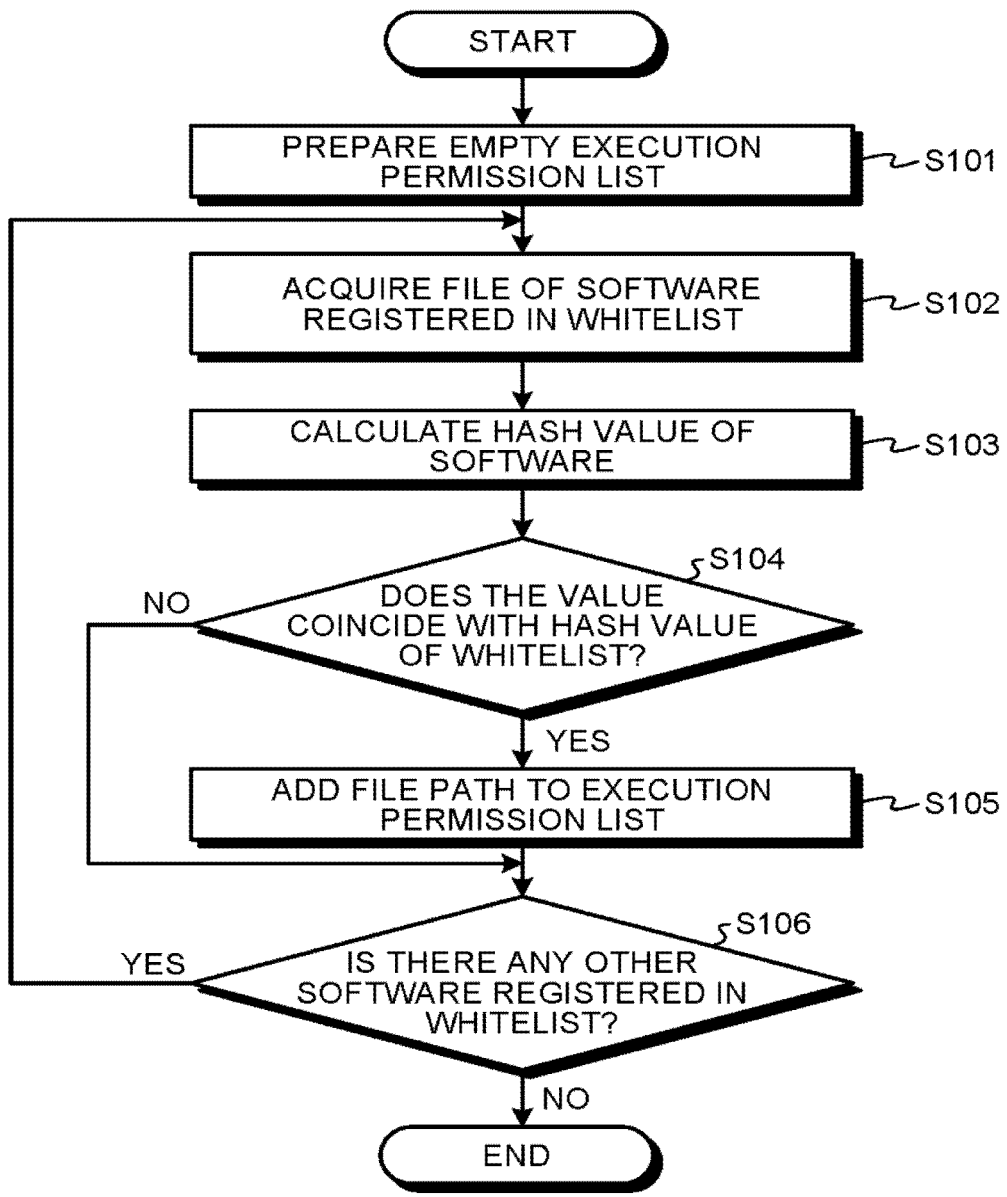
FIG. 4 is a flowchart illustrating an example of a processing procedure of a prior verifying unit.
Figure 5:
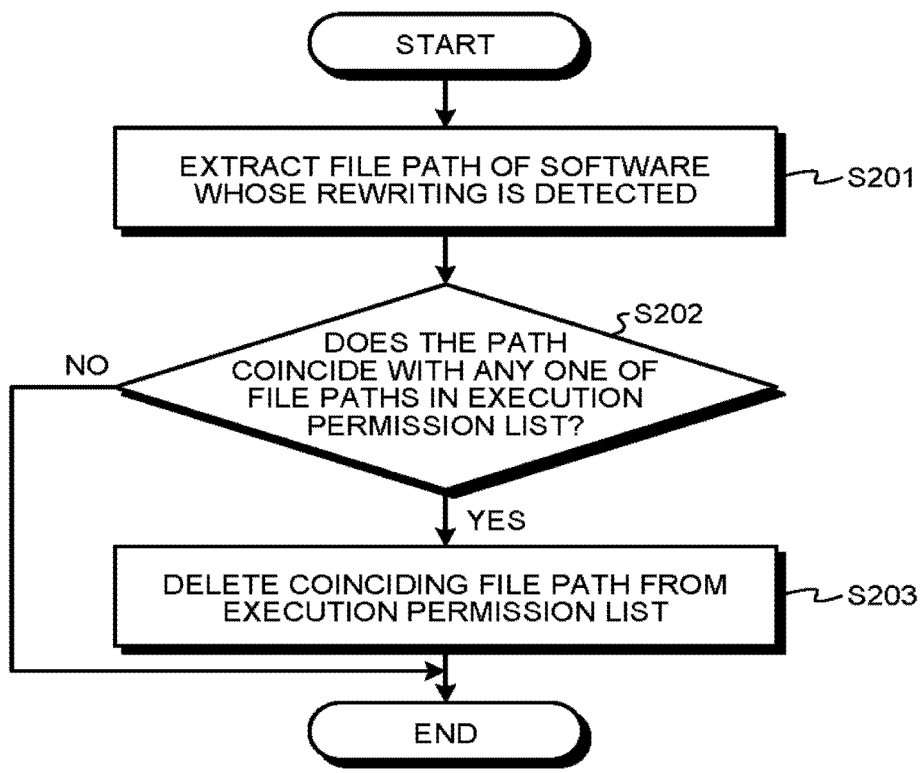
FIG. 5 is a flowchart illustrating an example of a processing procedure of an invalidating unit.

A specific example of an operation by the information processing device 10 of the present embodiment will be described below with reference to flowcharts of FIGS. 4 to 6.

First, a process by the prior verifying unit 11 will be described with reference to FIG. 4. FIG. 4 is a flowchart illustrating an example of a processing procedure of the prior verifying unit 11. A series of processes illustrated in the flowchart of FIG. 4 is executed each time the verification execution event is detected.

If the verification execution event is detected, first, the prior verifying unit 11 prepares an empty execution permission list L2 in which no execution-permitted software is registered (Step S101).

Then, the prior verifying unit 11 acquires the file of the software with reference to the file path of the software registered in the whitelist L1 (Step S102). Then, the prior verifying unit 11 calculates the hash value of the software on the basis of the file acquired in Step S102 (Step S103).

Then, the prior verifying unit 11 collates the hash value calculated in Step S103 with the hash value of the whitelist L1, and determines whether or not the two hash values coincide with each other (Step S104). Here, when the hash value calculated in Step S103 coincides the hash value of the whitelist L1 (Step S104: Yes), the prior verifying unit 11 adds the file path of that software to the execution permission list L2 (Step S105), and the process proceeds to Step S106. On the other hand, when the hash value calculated in Step S103 does not coincide with the hash value of the whitelist L1 (Step S104: No), the process directly proceeds to Step S106.

Then, the prior verifying unit 11 checks whether or not there is any other software registered in the whitelist L1 (Step S106). Here, when there is another software registered in the whitelist L1 (Step S106: Yes), the flow returns to Step S102, and the process starting from Step S102 is repeated. Then, when the process starting from Step S102 is performed on all pieces of software registered in the whitelist L1 (Step S106: No), a series of processes ends.

Next, a process by the invalidating unit 13 will be described with reference to FIG. 5. FIG. 5 is a flowchart illustrating an example of a processing procedure of the invalidating unit 13. A process illustrated in the flowchart of FIG. 5 is executed each time rewriting of software is detected by the rewriting detecting unit 12.

If rewriting of software is detected by the rewriting detecting unit 12, first, the invalidating unit 13 extracts the file path of the software whose rewriting is detected (Step S201).

Then, the invalidating unit 13 determines whether or not the file path extracted in Step S201 coincides with any file path in the execution permission list L2 with reference to the execution permission list L2 (Step S202). In a case in which the file path extracted in Step S201 coincides with any file path in the execution permission list L2 (Step S202: Yes), the matching file path is deleted from the execution permission list L2 (Step S203). Accordingly, the registration of software whose rewriting is detected as the execution-permitted software is invalidated.

Next, a process by the execution control unit 14 will be described with reference to FIG. 6. FIG. 6 is a flowchart illustrating an example of a processing procedure of the execution control unit 14. A process illustrated in the flowchart of FIG. 6 is executed each time an execution start of software is detected.

If an execution start of software is detected, the execution control unit 14 temporarily stops the execution of the software (Step S301), and extracts the file path of the software (Step S302).

Then, the execution control unit 14 determines whether or not the file path extracted in Step S302 coincides with any one of the file paths in the execution permission list L2 with reference to the execution permission list L2 (Step S303). Then, when the file path extracted in Step S302 coincides with any one of the file paths in the execution permission list L2 (Step S303: Yes), the execution control unit 14 permits the execution of the software, and causes the execution of the software which is temporarily stopped in Step S301 to be resumed (Step S304). On the other hand, when the file path extracted in Step S302 does not coincide with the file path in the execution permission list L2 (Step S304: No), the execution control unit 14 declines the execution of the software (Step S305), and outputs, for example, an alert or the like. As described above, Step S305 may be replaced with other processes such as a process of performing verification of the integrity of software which is temporarily stopped and permitting execution of the software when the verification is successfully performed.

As described above in detail with reference to the specific examples, the information processing device 10 of the present embodiment verifies the integrity of the software registered in the whitelist L1 at a timing at which the verification execution event is detected, that is, a timing which does not depend on the execution start of the software, and registers the software which is successfully verified in the execution permission list L2 as the execution-permitted software. Then, when the execution start of software is detected, the information processing device 10 of the present embodiment permits the execution of the software when the software whose execution start is detected is registered in the execution permission list L2 as the execution-permitted software with reference to the execution permission list L2. As described above, the information processing device 10 of the present embodiment performs verification of the integrity of software with a large processing load at a timing that does not depend on the execution start of the software, and determines whether or not the execution of the software is permitted with reference to only the execution permission list L2 when the execution of the software is started. Therefore, it is possible to secure the safety of the system by the whitelist type execution control while effectively suppressing the occurrence of a delay caused by the execution start of the software.

Further, in the information processing device 10 of the present embodiment, when the software whose rewriting is detected is registered in the execution permission list L2 as the execution-permitted software, the registration of the software as the execution-permitted software is invalidated, and thus it is possible to effectively prevent the execution of the software from being permitted in a case in which unauthorized rewriting or the like occurs in the software registered in the whitelist L1.

Second Embodiment

Next, a second embodiment will be described. In the first embodiment, the prior verifying unit 11 performs the verification of the integrity of all pieces of software registered in the whitelist L1, but in the present embodiment, the prior verifying unit 11 performs the verification of the integrity of some pieces of software registered in a whitelist L1'. Further, the execution control unit 14 performs the verification of the integrity of software which does not undergone the verification of the integrity by the prior verifying unit 11 among the software registered in the whitelist L1' using a method similar to that of the prior verifying unit 11 when the execution start of the software is detected.

A basic configuration of the information processing device 10 is similar to that in the first embodiment.

Processes of the rewriting detecting unit 12 and the invalidating unit 13 are similar to those in the first embodiment. In the following description, description duplicating the first embodiment will be omitted as appropriate, and the description will proceed with features points of the present embodiment.

Figures 6, 7:
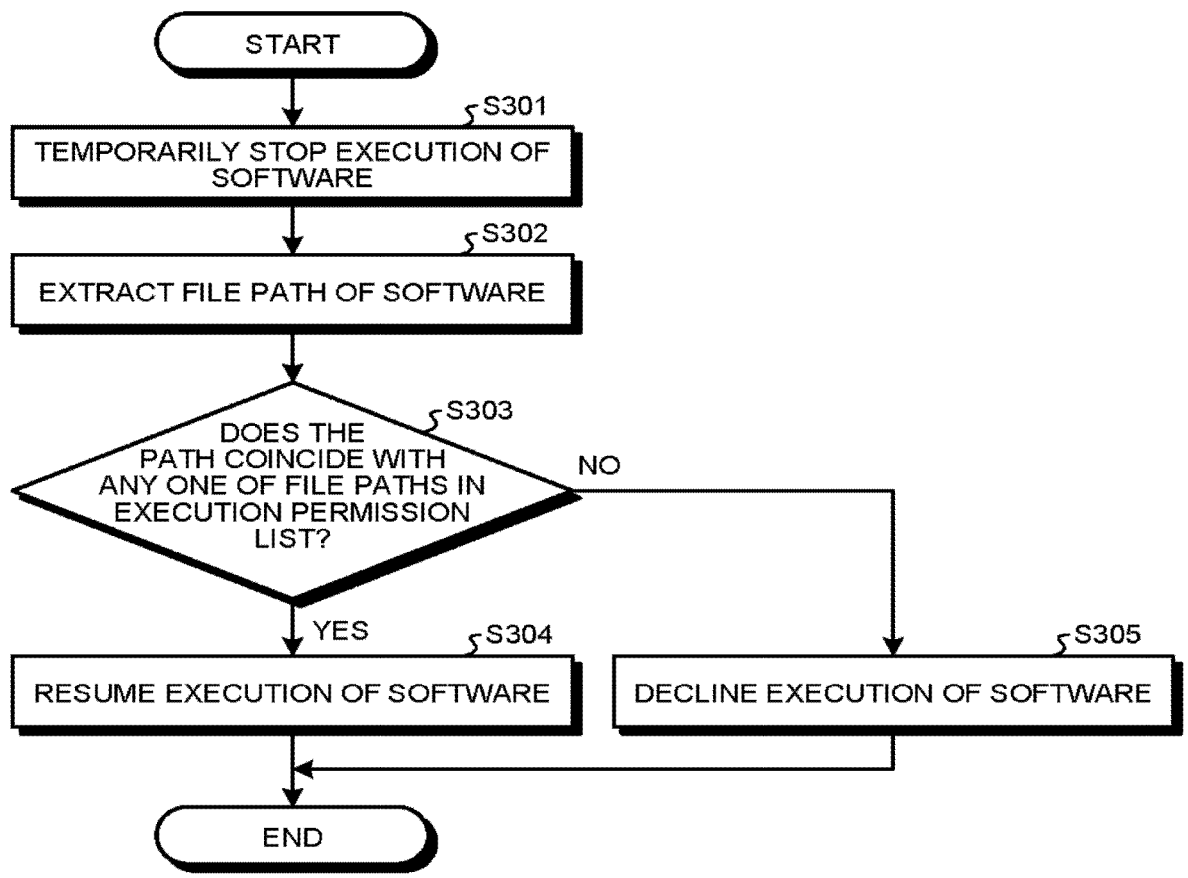
FIG. 6 is a flowchart illustrating an example of a processing procedure of an execution control unit.
FIG. 7 is a diagram illustrating an example of a whitelist.

FIG. 7 is a diagram illustrating an example of the whitelist L1' in the present embodiment. The whitelist L1' illustrated in FIG. 7 differs from the whitelist L1 illustrated in FIG. 2 in that a prior verification flag is added to each entry. The prior verification flag is a flag indicating whether or not the integrity by the prior verifying unit 11 is performed, and indicates that the integrity by the prior verifying unit 11 is performed when it has a valid value (for example, "1") and the integrity by the prior verifying unit 11 is not performed when it has an invalid value (for example, "0").

The whitelist L1' may be divided into a whitelist whose prior verification flag has a valid value and a whitelist whose prior verification flag has an invalid value. In this case, the valid value or the invalid value of the prior verification flag can be identified by the divided whitelists.

For this reason, these divided whitelists need not necessarily have the prior verification flag. Furthermore, the prior verification flag may be stored in file meta information such as an inode extension attribute of software described in each entry instead of the whitelist L1'.

Software to be subject to the verification of the integrity by the prior verifying unit 11 can be decided arbitrarily by, for example, the system administrator. For example, software with a high execution frequency, software with a large file size, software which performs a process with a high urgency (software in which it is desirable to suppress a delay at the time of execution), or the like among software registered in the whitelist L1' may be decided as software to be subject to the verification of the integrity by the prior verifying unit 11. Further, the prior verifying unit 11 may dynamically decide whether or not the prior verification is performed on the basis of the acquired execution frequency, the file size, or the like of software instead of the prior verification flag.

If the verification execution event is detected, the prior verifying unit 11 of the present embodiment performs the verification of the integrity of software whose prior verification flag has a valid value among the software registered in the whitelist L1' using a method similar to that in the first embodiment. Further, similarly to the first embodiment, the execution permission list L2 (see FIG. 3) in which the software which is successfully verified is registered as the execution-permitted software is generated.

Further, the prior verifying unit 11 of the present embodiment generates a to-be-verified list L3 in which registers software whose prior verification flag has an invalid value among software registered in the whitelist L1'.

Figure 8:
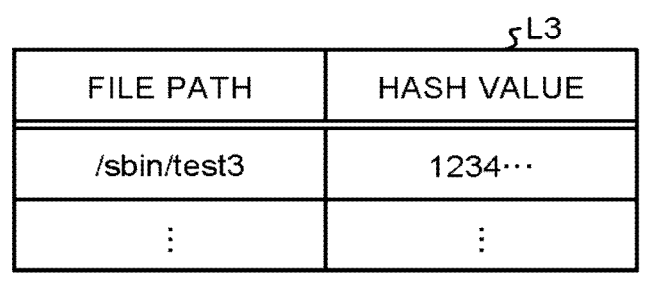

FIG. 8 is a diagram illustrating an example of a to-be-verified list L3. For example, as illustrated in FIG. 8, a set of a file path and a hash value of software which has not undergone the verification of the integrity by the prior verifying unit 11 (software whose prior verification flag has an invalid value) among software registered in the whitelist L1' is stored in the to-be-verified list L3. The to-be-verified list L3 is held in, for example, a RAM or the like.

When the execution start of software is detected, the execution control unit 14 of the present embodiment permits the execution of the software when software whose execution start is detected is registered in the execution permission list L2 as the execution-permitted software with reference to the execution permission list L2 using a method similar to that in the first embodiment. In a case in which the software whose execution start is detected is not registered in the execution permission list L2, the execution control unit 14 of the present embodiment then checks whether or not the software whose execution start is detected is registered in the to-be-verified list L3 with reference to the to-be-verified list L3. Then, in a case in which the software whose execution start is detected is registered in the to-be-verified list L3, the execution control unit 14 of the present embodiment performs the verification of the integrity of the software using a method similar to that of the prior verifying unit 11, and permits the execution of the software when the software is registered in the execution permission list L2 as the execution-permitted software when the verification is successfully performed.

Further, the execution control unit 14 of the present embodiment declines the execution of the software in a case in which the software whose execution start is detected is not registered in the to-be-verified list L3 or in a case in which the software is registered in the to-be-verified list L3, but the verification of the integrity fails. Further, similarly to the first embodiment, instead of declining the execution of the software, an alert indicating the occurrence of an abnormality may be output, transitions to the abnormal mode in which some functions of the system are restricted may be performed, and then, the execution of the software may be permitted. At this time, transition from the abnormal mode to a normal mode may be performed in accordance with a predetermined manipulation by a system administrator, or the execution of software whose execution start is detected may be permitted under condition of a predetermined manipulation by a system administrator.

In the present embodiment, software whose prior verification flag has an invalid value among the software registered in the whitelist L1' is registered in the to-be-verified list L3, but software which fails in the verification of the integrity by the prior verifying unit 11 may be also registered in the to-be-verified list L3. In this case, when the execution start of the software which fails in the verification of the integrity by the prior verifying unit 11 is detected, the execution control unit 14 performs the verification of the integrity of the software again, and permits the execution of the software when the verification is successfully performed.

Figure 9:
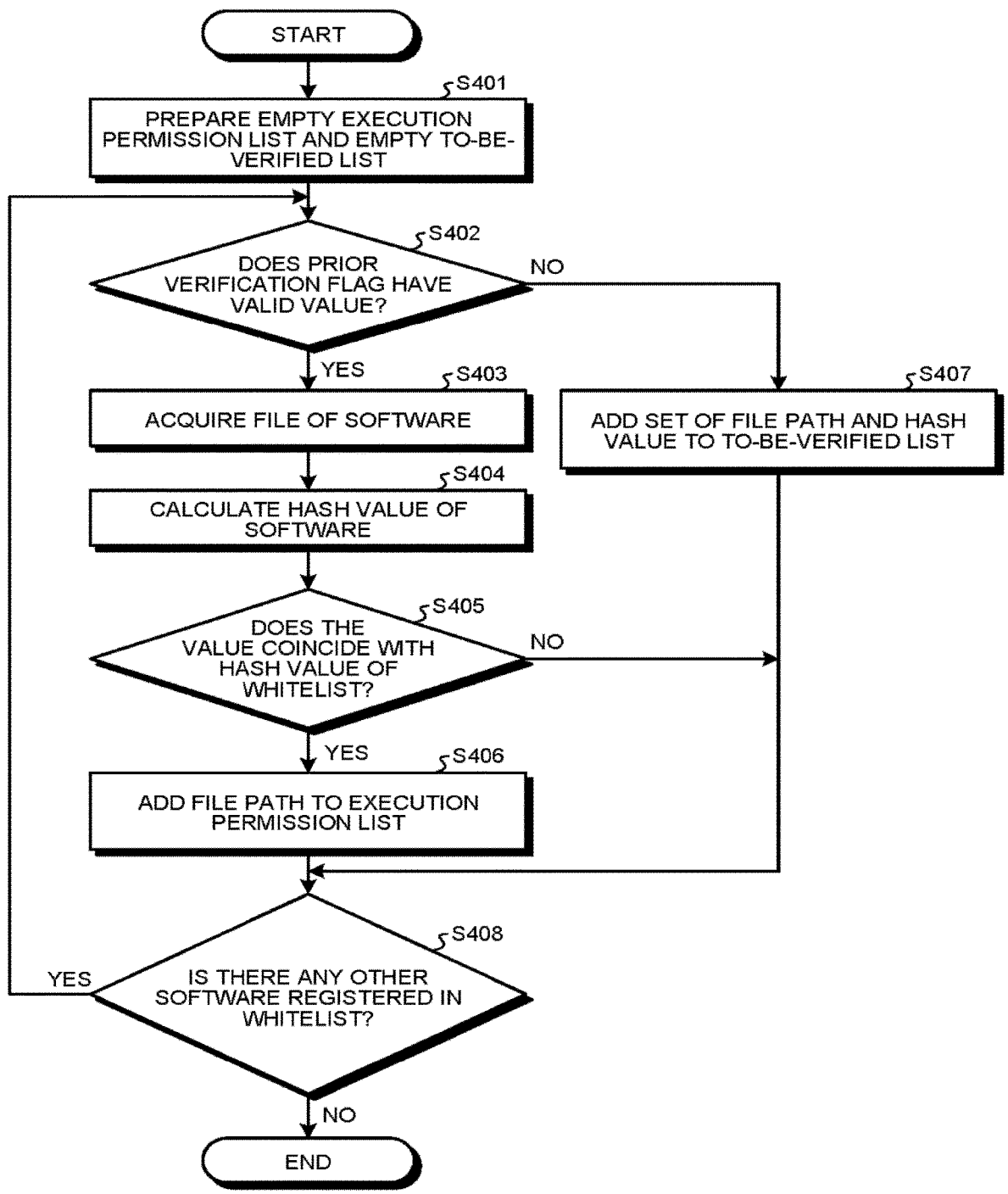
FIG. 9 is a flowchart illustrating an example of a processing procedure of a prior verifying unit.
Figure 10:
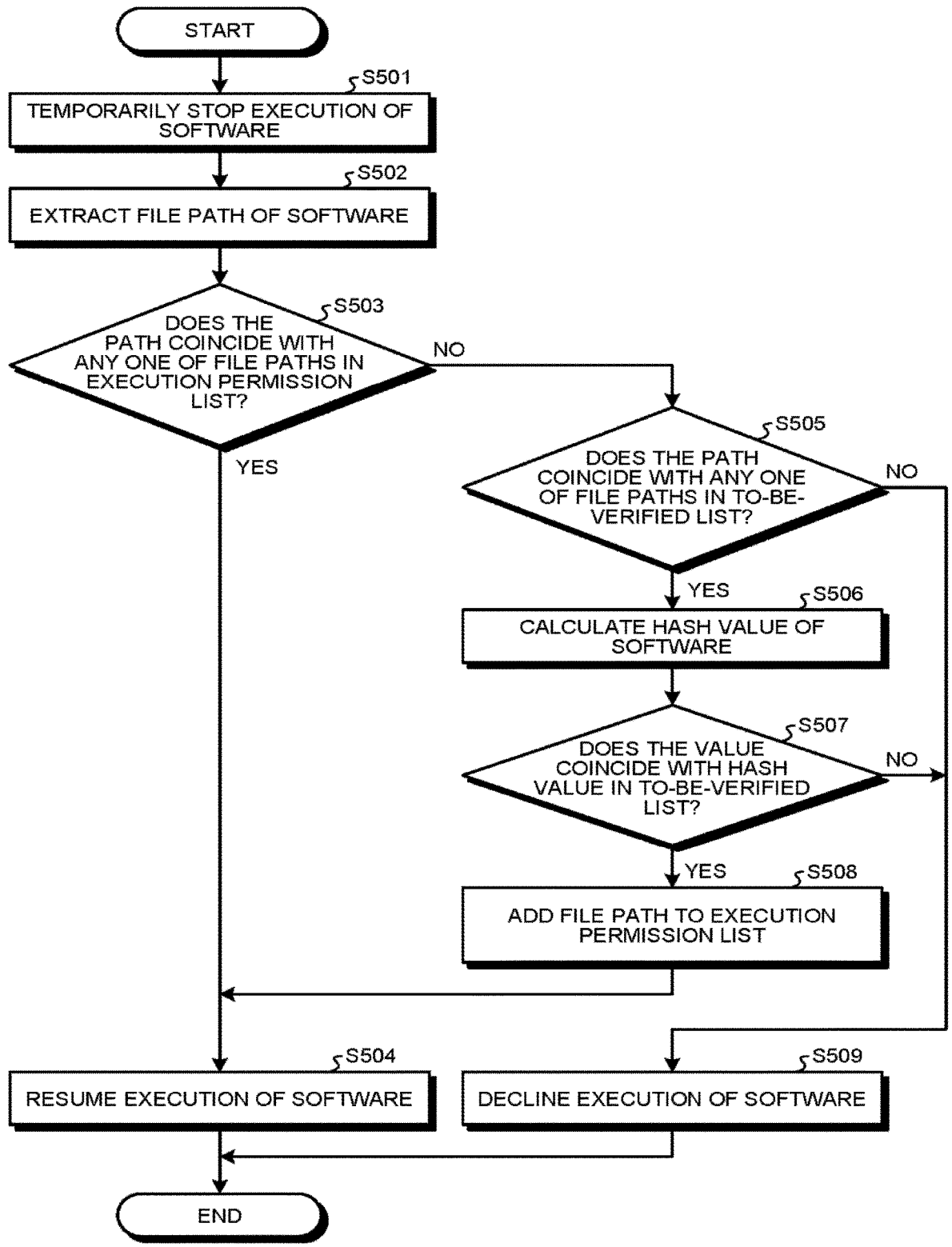
FIG. 10 is a flowchart illustrating an example of a processing procedure of an execution control unit.

A specific example of an operation by the information processing device 10 of the present embodiment will be described below with reference to flowcharts of FIG. 9 and FIG. 10.

First, a process by the prior verifying unit 11 of the present embodiment will be described with reference to FIG. 9. FIG. 9 is a flowchart illustrating an example of a processing procedure of the prior verifying unit 11 of the present embodiment. A series of processes illustrated in the flowchart of FIG. 9 is executed each time the verification execution event is detected.

If the verification execution event is detected, first, the prior verifying unit 11 prepares an empty execution permission list L2 in which no execution-permitted software is registered and an empty to-be-verified list L3 (Step S401).

Then, the prior verifying unit 11 selects one entry of the whitelist L1' and checks whether or not the prior verification flag added to the entry has a valid value (Step S402). Here, if the prior verification flag has a valid value (Step S402: Yes), the prior verifying unit 11 acquires the file of software with reference to the file path of the software registered in the entry (Step S403). Then, the prior verifying unit 11 calculates the hash value of the software on the basis of the file acquired in Step S403 (Step S404).

Then, the prior verifying unit 11 collates the hash value calculated in Step S404 with the hash value of the whitelist L1', and determines whether or not both hash values coincide with each other (Step S405). Here, when the hash value calculated in Step S404 coincides with the hash value of the whitelist L1' (Step S405: Yes), the prior verifying unit 11 adds the file path of the software to the execution permission list L2 (Step S406), and the process proceeds to Step S408. On the other hand, when the hash value calculated in Step S404 does not coincide with the hash value of the whitelist L1' (Step S405: No), the process proceeds to Step S408 without change.

If the prior verification flag added to the entry selected in Step S402 has an invalid value (Step S402: No), the prior verifying unit 11 adds a set of the file path and the hash value of the software registered in the entry to the to-be-verified list L3 (Step 407), and the process proceeds to Step S408.

Then, the prior verifying unit 11 checks whether or not there is any other software registered in the whitelist L1' (Step S408). Here, when there is another software registered in the whitelist L1' (Step S408: Yes), the process returns to Step S402, and the process starting from Step S402 is repeated. Then, when the process starting from Step S402 is performed on all pieces of software registered in the whitelist L1' (Step S408: No), a series of processes ends.

Next, a process by the execution control unit 14 of the present embodiment will be described with reference to FIG. 10. FIG. 10 is a flowchart illustrating an example of a processing procedure of the execution control unit 14 of the present embodiment. A series of processes illustrated in the flowchart of FIG. 10 is executed each time the execution start of software is detected.

If an execution start of software is detected, the execution control unit 14 temporarily stops the execution of the software (Step S501), and extracts the file path of the software (Step S502).

Then, the execution control unit 14 determines whether or not the file path extracted in Step S502 coincides with any one of the file paths in the execution permission list L2 with reference to the execution permission list L2 (Step S503). Then, when the file path extracted in Step S502 coincides with any one of the file paths in the execution permission list L2 (Step S503: Yes), the execution control unit 14 permits the execution of the software, and causes the execution of the software which is temporarily stopped in Step S501 to be resumed (Step S504).

On the other hand, when the file path extracted in Step S502 does not coincide with the file path in the execution permission list L2 (Step S504: No), then the execution control unit 14 determines whether or not the file path extracted in Step S502 coincides with any one of the file paths in the to-be-verified list L3 with reference to the to-be-verified list L3 (Step S505). Further, when the file path extracted in Step S502 coincides with any one of the file paths in the to-be-verified list L3 (Step S505: Yes), the execution control unit 14 calculates the hash value of the software whose execution start is detected (Step S506).

Then, the execution control unit 14 collates the hash value calculated in Step S506 with the hash value in the to-be-verified list L3, and determines whether or not the two hash values coincide with each other (Step S507). Here, when the hash value calculated in Step S506 coincides with the hash value in the to-be-verified list L3 (Step S507: Yes), the execution control unit 14 adds the file path extracted in Step S502 to the execution permission list L2 (Step S508), then causes the process to proceed to Step S504, permits the execution of the software, and causes the execution of the software which is temporarily stopped in Step S501 to be resumed.

On the other hand, when the hash value calculated in Step S506 does not coincide with the hash value in the to-be-verified list L3 (Step S507: No), the execution control unit 14 declines the execution of the software (Step S509), and outputs, for example, an alert or the like. Further, when the file path extracted in Step S502 does not coincide with the file path in the execution permission list L2 and also does not coincide with the file path in the to-be-verified list L3 (Step S505: No), the prior verifying unit 11 declines the execution of the software, and outputs, for example, an alert or the like.

As described above, the information processing device 10 of the present embodiment performs the verification of the integrity by the prior verifying unit 11 only for predetermined some pieces of software such as, for example, software with a high execution frequency, software with a large file size, software which performs a process with a high urgency, or the like among software registered in the whitelist L1'. Therefore, it is possible to reduce the processing load when the verification execution event is detected and to generate the execution permission list L2 in a short time.

In the above description, the software to be verified by the prior verifying unit 11 is identified by the value of the to-be verified flag added to each entry of the whitelist L1', but the present embodiment is not limited thereto. For example, the whitelist L1' may be divided into a first list in which software to be verified by the prior verifying unit 11 is registered and a second list in which software not to be verified by the prior verifying unit 11 is registered, and the prior verifying unit 11 may perform the verification of the integrity of the software registered in the first list when the verification execution event is detected. In this case, the to-be-verified list L3 can be easily generated by copying the second list without change.

Third Embodiment

Next, a third embodiment will be described. In the present embodiment, similarly to the second embodiment above, only some pieces of the software registered in the whitelist L1' undergo the verification of the integrity by the prior verifying unit 11, but a difference lies in that software which does not undergo the verification of the integrity by the prior verifying unit 11 is identified by a value of a flag added to the execution permission list L2. A basic configuration of the information processing device 10 is similar to those of the first and second embodiments. In the following description, description duplicating the first and second embodiments will be omitted as appropriate, and the description will proceed with features points of the present embodiment.

FIG. 11 is a diagram illustrating an example of an execution permission list L2' in the present embodiment. A set of a file path and a hash value of software and a value of a verified flag are stored in the execution permission list L2' illustrated in FIG. 11 for each pieces of the software registered in the whitelist L1. The verified flag is a flag indicating whether or not the verification of the integrity is completed, and indicates that the verification of the integrity is completed if it has a valid value (for example, "1") and indicates that the verification of the integrity is not completed if it has an invalid value (for example, "0"). In the present embodiment, among the software in the execution permission list L2', software whose verified flag has a valid value is software registered as the execution-permitted software.

Since the execution permission list L2' illustrated in FIG. 11 has a format similar to that of the whitelist L1' illustrated in FIG. 7, the execution permission list L2' can be generated by copying the whitelist L1' and manipulating the flag. In other words, the execution permission list L2' of an initial state is generated by copying the whitelist L1' and replacing the prior verification flag in the whitelist L1' with the verified flag (the prior verification flag is regarded as the verified flag). Then, the execution permission list L2' in which the process by the prior verifying unit 11 is reflected can be generated by rewriting the value of verified flag corresponding to the software which fails in the verification of integrity by the prior verifying unit 11 from a valid value to an invalid value.

If the verification execution event is detected, first, the prior verifying unit 11 of the present embodiment generates the execution permission list L2' of the initial state by copying the whitelist L1' and replacing the prior verification flag in the whitelist L1' with the verified flag. Thereafter, the prior verifying unit 11 performs the verification of the integrity of the software whose prior verification flag has a valid value among the software registered in the whitelist L1' using a method similar to that in the first embodiment. The execution permission list L2' illustrated in FIG. 11 is generated by rewriting the verified flag in the execution permission list L2' of the initial state from the valid value to the invalid value.

When the rewriting of the software is detected by the rewriting detecting unit 12, the invalidating unit 13 of the present embodiment checks whether or not the software registered in the execution permission list L2' as the execution-permitted software, that is, the value of the verified flag has the valid value. Then, when the software whose rewriting is detected is registered in the execution permission list L2' as the execution-permitted software, the registration as the execution-permitted software is invalidated by rewriting the value of the verified flag of the software from the valid value to the invalid value.

When the execution start of the software is detected, the execution control unit 14 of the present embodiment permits the execution of the software if the software whose execution start is detected is registered in the execution permission list L2' as the execution-permitted software, that is, if there is software whose execution start is detected in the execution permission list L2', and the value of the verified flag is the valid value with reference to the execution permission list L2'. Further, if there is software whose execution start is detected in the execution permission list L2', but the value of the verified flag is the invalid value, the execution control unit 14 performs the verification of the integrity of the software using a method similar to that of the prior verifying unit 11, and rewrites the value of verified flag from the invalid value to the valid value and permits the execution of the software when the verification is successfully performed.

Further, the execution control unit 14 of the present embodiment declines the execution of the software in a case in which there is no software whose execution start is detected in the execution permission list L2' or in a case in which there is software whose execution start is detected in the execution permission list L2' but it fails in the verification as a result of performing the verification of the integrity since the value of the verified flag is the invalid value. Further, similarly to the first embodiment, instead of declining the execution of the software, an alert indicating the occurrence of an abnormality may be output, transitions to the abnormal mode in which some functions of the system are restricted may be performed, and then, the execution of the software may be permitted. At this time, transition from the abnormal mode to a normal mode may be performed in accordance with a predetermined manipulation by a system administrator, or the execution of software whose execution start is detected may be permitted under condition of a predetermined manipulation by a system administrator.

Figure 12:
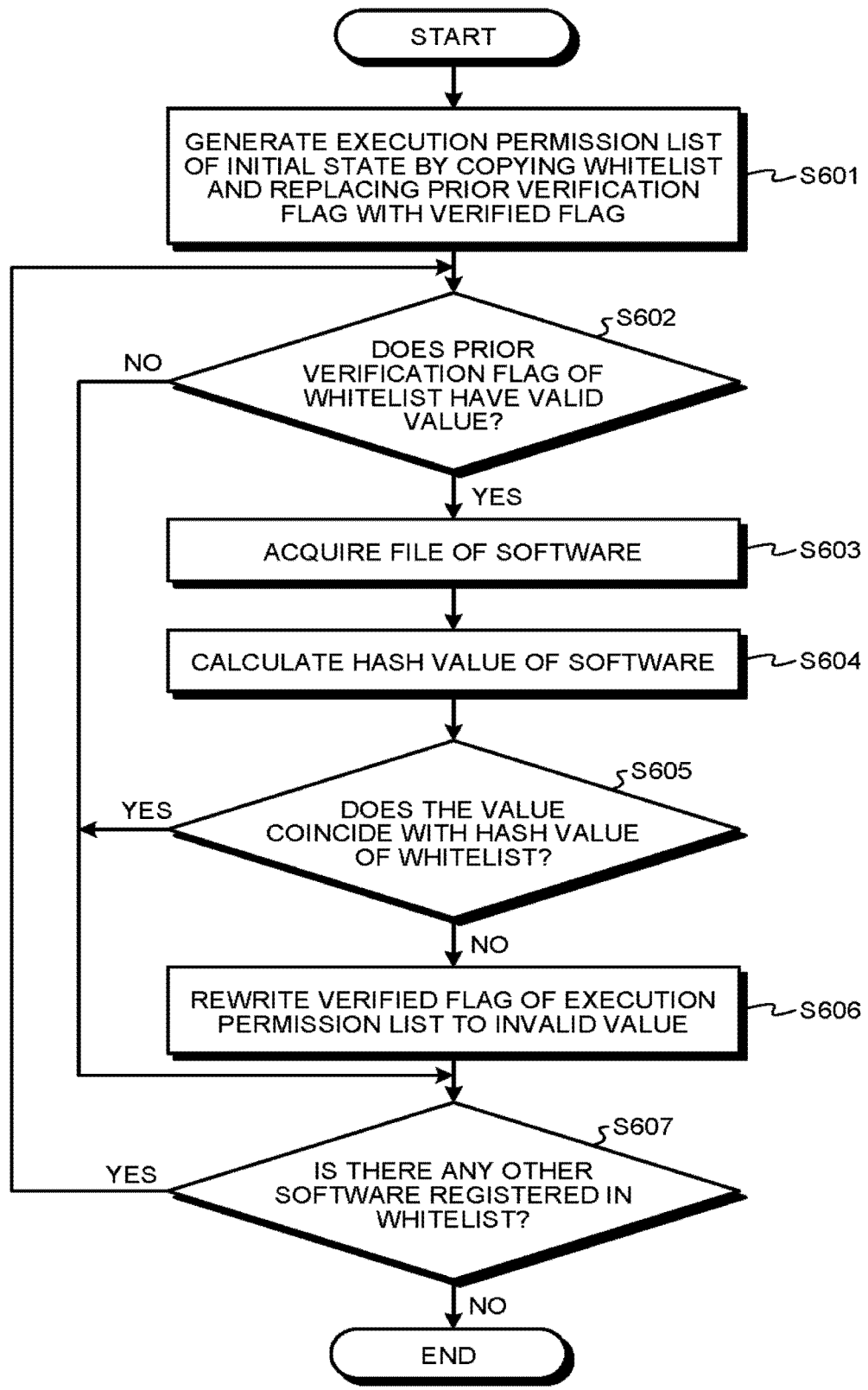
FIG. 12 is a flowchart illustrating an example of a processing procedure of a prior verifying unit.
Figure 13:
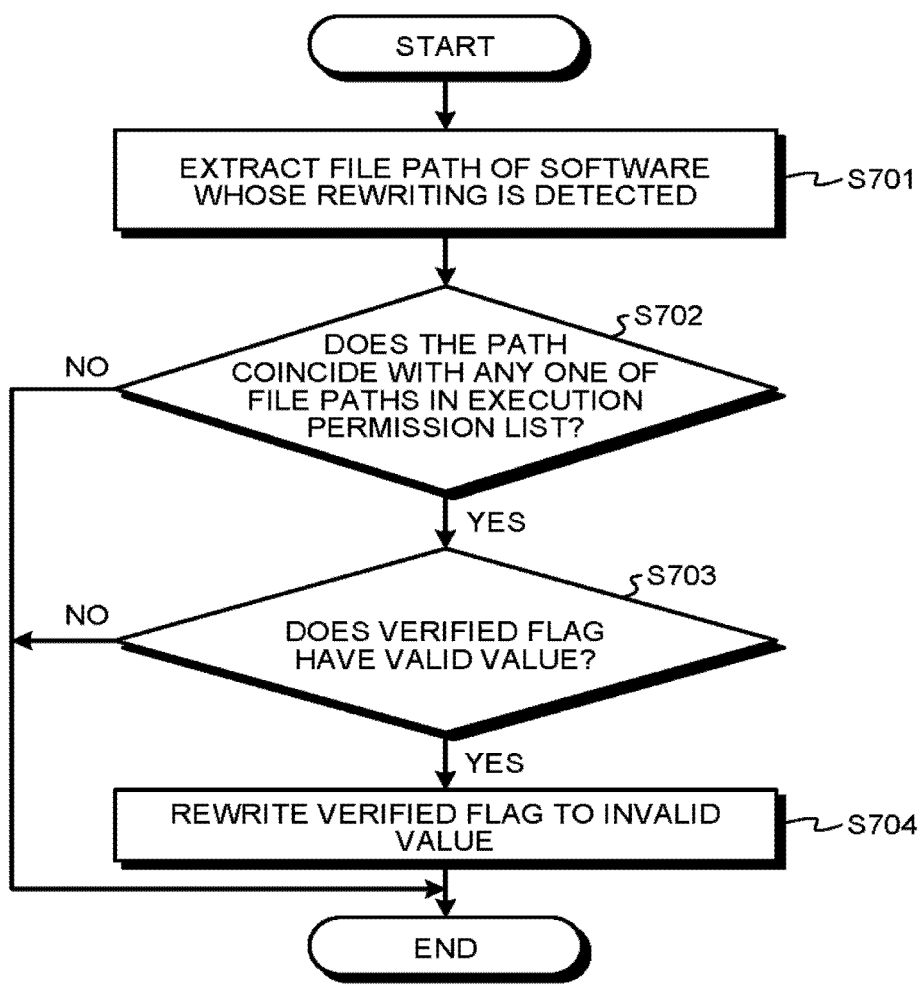
FIG. 13 is a flowchart illustrating an example of a processing procedure of an invalidating unit.
Figure 14:
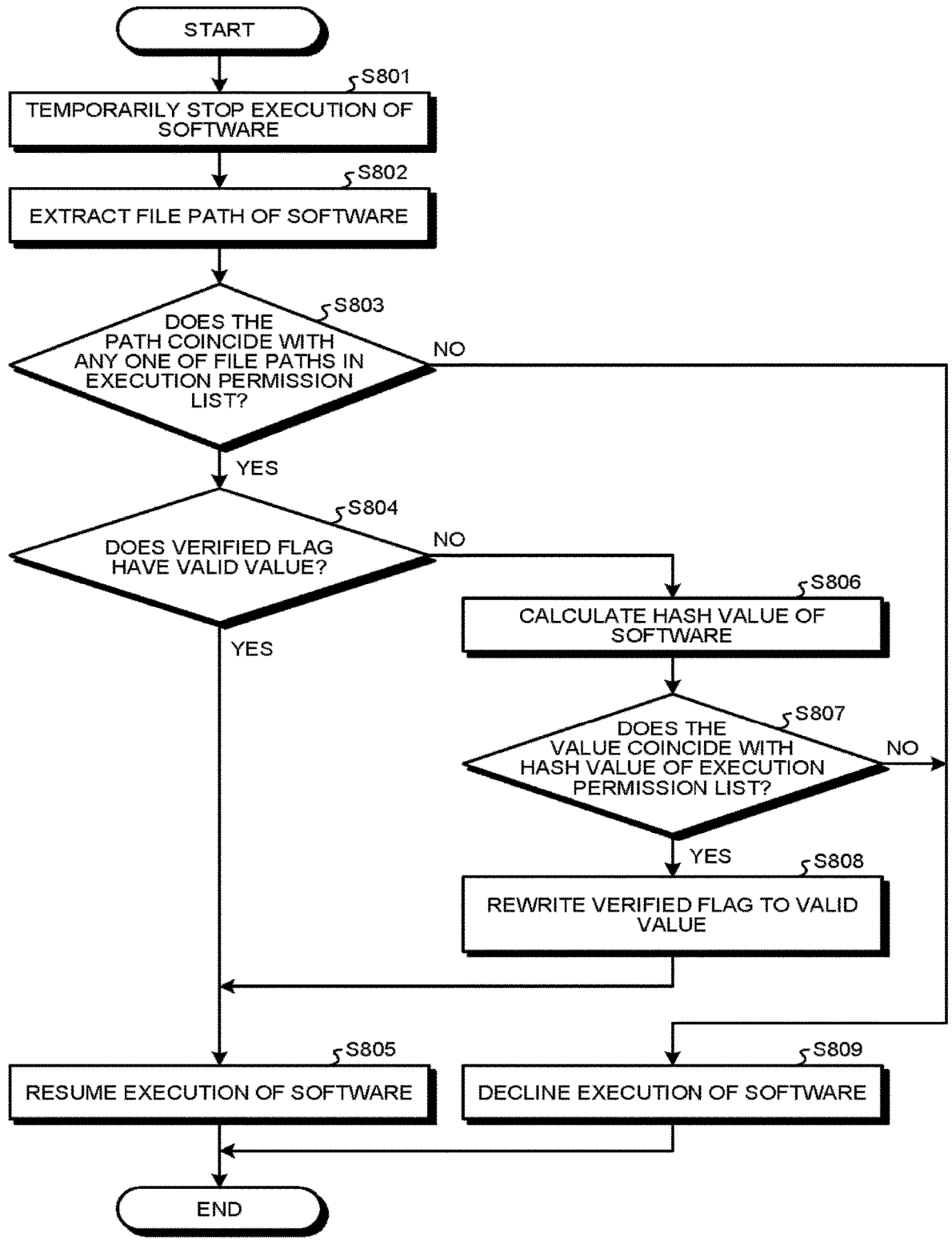
FIG. 14 is a flowchart illustrating an example of a processing procedure of an execution control unit.

A specific example of an operation by the information processing device 10 of the present embodiment will be described below with reference to flowcharts of FIGS. 12 to 14.

First, a process by the prior verifying unit 11 of the present embodiment will be described with reference to FIG. 12. FIG. 12 is a flowchart illustrating an example of a processing procedure of the prior verifying unit 11 of the present embodiment. A series of processes illustrated in the flowchart of FIG. 12 is executed each time the verification execution event is detected.

If the verification execution event is detected, first, the prior verifying unit 11 generates the execution permission list L2' of the initial state by copying the whitelist L1' and replacing the prior verification flag in the whitelist L1' with the verified flag (Step S601).

Then, the prior verifying unit 11 selects one entry of the whitelist L1' and checks whether or not the prior verification flag added to the entry has the valid value (Step S602). Here, when the prior verification flag has the valid value (Step S602: Yes), the prior verifying unit 11 acquires the file of the software with reference to the file path of the software registered in the entry (Step S603). Then, the prior verifying unit 11 calculates the hash value of the software on the basis of the file acquired in Step S603 (Step S604).

Then, the prior verifying unit 11 collates the hash value calculated in Step S604 with the hash value of the whitelist L1', and determines whether or not both hash values coincide with each other (Step S605). Here, when the hash value calculated in Step S604 does not coincide with the hash value of the whitelist L1' (Step S605: No), the prior verifying unit 11 rewrites the verified flag of a corresponding entry in the execution permission list L2' from the valid value to the invalid value (Step S606), and the process proceeds to Step S607. On the other hand, when the hash value calculated in Step S604 coincides with the hash value of the whitelist L1' (Step S605: Yes), the process proceeds to Step S607 without change.

Then, the prior verifying unit 11 checks whether or not there is any other software registered in the whitelist L1' (Step S607). Here, when there is another software registered in the whitelist L1' (Step S607: Yes), the process returns to Step S602, and the process starting from Step S602 is repeated. Then, when the process starting from Step S602 is performed for all pieces of software registered in the whitelist L1' (Step S607: No), and a series of processes ends.

Next, a process by the invalidating unit 13 of the present embodiment will be described with reference to FIG. 13. FIG. 13 is a flowchart illustrating an example of a processing procedure of the invalidating unit 13. A process illustrated in the flowchart of FIG. 13 is executed each time rewriting of software is detected by the rewriting detecting unit 12.

If rewriting of software is detected by the rewriting detecting unit 12, first, the invalidating unit 13 extracts the file path of the software whose rewriting is detected (Step S701).

Then, the invalidating unit 13 determines whether or not the file path extracted in Step S701 coincides with any one of the file paths in the execution permission list L2' with reference to the execution permission list L2' (Step S702). Then, when the file path extracted in Step S701 coincides with any one of the file paths in the execution permission list L2' (Step S702: Yes), the invalidating unit 13 determines whether or not the verified flag of the entry storing the file path has the valid value (Step S703), and when the verified flag has the valid value (Step S703: Yes) the verified flag is rewritten from the valid value to the invalid value (Step S704). Accordingly, the registration of the software whose rewriting is detected as the execution-permitted software is invalidated.

Next, a process by the execution control unit 14 of the present embodiment will be described with reference to FIG. 14. FIG. 14 is a flowchart illustrating an example of a processing procedure of the execution control unit 14 of the present embodiment. A series of processes illustrated in the flowchart of FIG. 14 is executed each time the execution start of software is detected.

If the execution start of software is detected, the execution control unit 14 temporarily stops the execution of the software (Step S801), and extracts the file path of the software (Step S802).

Then, the execution control unit 14 determines whether or not the file path extracted in Step S802 coincides with any one of the file paths in the execution permission list L2' with reference to the execution permission list L2' (Step S803).

Then, when the file path extracted in Step S802 coincides with any of the file paths in the execution permission list L2' (Step S803: Yes), the execution control unit 14 checks whether or not the verified flag of the entry storing the file path has the valid value (Step S804), and when the verified flag has the valid value (Step S804: Yes), the execution control unit 14 permits the execution of the software and causes the execution of the software which is temporarily stopped in Step S801 to be resumed (Step S805).

On the other hand, when the verified flag has the invalid value (Step S804: No), the execution control unit 14 calculates the hash value of the software whose execution start is detected (Step S806). Then, the execution control unit 14 collates the hash value calculated in Step S806 with the hash value of the execution permission list L2', and determines whether or not both hash values coincide with each other (Step S807). Here, when the hash value calculated in Step S806 coincides with the hash value of the execution permission list L2' (Step S807: Yes), the execution control unit 14 rewrites the verified flag of the entry corresponding to the software from the invalid value to the valid value (Step S808), then the process proceeds to Step S805, permits the execution of the software, and causes the execution of the software which is temporarily stopped in Step S801 to be resumed.

On the other hand, when the hash value calculated in Step S806 does not coincide with the hash value of the execution permission list L2' (Step S807: No), the execution control unit 14 declines the execution of the software (Step S809), and outputs, for example, an alert or the like. Further, when the file path extracted in Step 3802 does not coincide with the file path in the execution permission list L2' (Step S803: No), similarly, the execution control unit 14 declines the execution of the software, and outputs, for example, an alert or the like.

As described above, the information processing device 10 of the present embodiment generates the execution permission list L2' by copying the whitelist L1' and manipulating the flag, and identifies the software which does not undergo the verification of the integrity by the prior verifying unit 11 in accordance with the value of the flag of the execution permission list L2'. Therefore, it is possible to generate the execution permission list L2' more easily, and it is possible to identify software which does not undergo the verification of the integrity by the prior verifying unit 11 more easily.

In the above description, it is assumed that the verified flag added to each entry of the execution permission list L2' have two values, that is, the valid value and the invalid value, but in addition to the valid value and the invalid value, an execution non-permission value may be defined. Then, for at least one of software which fails in the verification of the integrity by prior verifying unit 11, software which fails in the verification of the integrity by the execution control unit 14, and software whose registration as the execution-permitted software is invalidated by the invalidating unit 13, the value of the verified flag may be set to the execution non-permission value, and the execution control unit 14 may not permit execution of software whose verified flag has the execution non-permission value.

In this case, the execution permission list L2' of the initial state can be generated by allocating two bits including surplus bits to the prior verification flag of the whitelist L1', copying the whitelist L1,' and replacing the prior verification flag with the verified flag, similarly to the above example.

First Modified Example

In each of the above embodiments, when the verification execution event is detected, the verification of the integrity is performed for at least some pieces of the software registered in the whitelist L1 (L1'), and software which succeeds in the verification is registered in the execution permission list L2 (L2') as the execution-permitted software, so that the processing load of determining whether or not the software is executed when the execution of software is started is reduced. Here, in the process of verifying the integrity of the software, a processing load of calculating the hash value of the software is particularly high, and the collation of the hash value is not heavily loaded. Therefore, when the verification execution event is detected, that is, at the timing which does not depend on the execution start of the software, only the calculation of the hash value for at least some pieces of software registered in the whitelist L1 (L1') may be performed, and a hash value list holding the calculated hash value is generated, and when the execution of the software is started, the hash value held in association with the software (the hash value of the hash value list calculated in advance) may be collated with the hash value of the whitelist L1 (L1'), and the execution of the software may be permitted when both hash values coincide with each other.

Second Modified Example

In each of the above embodiments, when the verification execution event is detected, the verification of the integrity is performed for at least some pieces of software registered in the whitelist L1 (L1'), and software which succeeds in the verification is registered in the execution permission list L2 (L2') as the execution-permitted software, so that the processing load of determining whether or not the software is executed when the execution of software is started is reduced. Here, in a case in which the execution starts of some pieces of software are detected while the prior verifying unit 11 is generating the execution permission list L2 (L2') after the verification execution event is detected, execution control for software whose execution start is detected may be given a priority.

For example, prior investigation information is newly set as information which can be referred to by the prior verifying unit 11 and the execution control unit 14. This is a flag having a valid value during the prior verification by the prior verifying unit 11 and an invalid value while the verification is not performed, and assumed to be set to the valid value when the prior verifying unit 11 detects the verification execution event and set to the invalid value after the prior verification ends or when the prior verifying unit 11 is activated. In a case in which the execution start of software is detected, the execution control unit 14 determines whether or not a current state is a state in which the verification by the prior verifying unit 11 is being performed with reference to the prior investigation information, stops the verification process of the prior verifying unit 11 while the verification is being performed, then performs execution control based on the collation of the hash value with reference to hash value calculation of an execution file and the whitelist L1 (L1') (the execution permission list L2' in the case of the third embodiment regardless of the registration state of the execution permission list L2 (L2'), and then causes the verification of the prior verifying unit 11 to be resumed, so that a priority can be given to the execution control for the software whose execution start is detected.

Supplemental Description

The information processing device 10 of each embodiment described above can be realized, for example, by cooperation of hardware constituting a common computer and a program (software) executed by a computer. The function of the information processing device 10 described in each of the above embodiments can be realized, for example, by executing a program stored as firmware in a non-volatile memory such as a read only memory (ROM) in advance through a computer.

Figure 15:
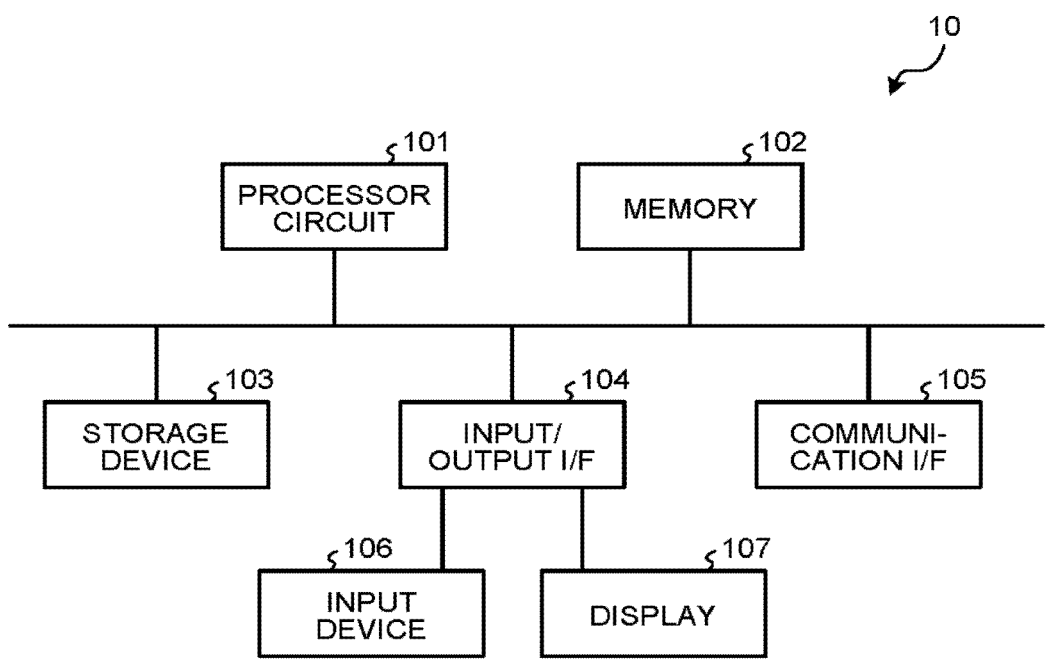
FIG. 15 is a block diagram illustrating an example hardware configuration of an information processing device.

FIG. 15 is a block diagram illustrating an example hardware configuration of the information processing device 10. As illustrated in FIG. 15, for example, the information processing device 10 can employ a hardware configuration of a common computer (a computer system) including a processor circuit 101 such as a central processing unit (CPU) or a graphics processing unit (GPU), a memory 102 such as a random access memory (RAM) or a ROM, a storage device 103 such as a hard disk drive (HDD) or a solid state drive (SDD), an input/output I/F 104 for connecting peripheral devices such as an input device 106 or a display 107, and a communication I/F 105. Further, for example, the processor circuit 101 can realize the functions of the respective units of the prior verifying unit 11, the rewriting detecting unit 12, the invalidating unit 13, and the execution control unit 14 by executing a program of firmware using the memory 102.

Further, the whitelist L1 (L1') may be stored in, for example, the storage device 103, and the execution permission list L2 (L2') or the to-be-verified list L3 may be held in the memory 102 (RAM).

In other words, for example, each of the above units can be stored in the ROM or the like and installed in a computer as a program constituting software, and when one or more processors included in the computer load the program from the ROM onto the RAM and execute the program, each of the above units can be generated on the RAM.

Further, the program for implementing the respective units of the information processing device 10 of each of the above embodiments may be provided in a form in which it is stored in a non-volatile memory such as a ROM in advance, and for example, the program may be stored in another computer connected to a network such as the Internet and provided by downloading via a network. Further, the program may be provided or distributed via a network such as the Internet. Further, the program may be provided in a form in which it is stored in a computer-readable recording medium.

Some or all of the respective units of the information processing device 10 of each of the above embodiments may be configured to be implemented by dedicated hardware such as application specific integrated circuit (ASIC) or field-programmable gate array (FPGA).

Further, the information processing device 10 of each of the above embodiments may be configured as a network system in which a plurality of computers are communicably connected or may be implemented such that the respective units are distributed to a plurality of computers. Further, the information processing device 10 of each of the above embodiments may be configured as a server device on a cloud system or a virtual machine which operates on a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
processing circuitry configured to:
verify integrity of software registered in a whitelist at a timing which does not depend on an execution start of software and generate an execution permission list in which software which is successfully verified is registered as execution-permitted software;
permit execution of the software when the execution start of the software is detected and the software is registered in the execution permission list as the execution-permitted software;
detect rewriting of software; and
invalidate, when software whose rewriting is detected is registered in the execution permission list as the execution-permitted software, registration of the software as the execution-permitted software in the execution permission list.

2. The information processing device according to claim 1,
wherein the processing circuitry invalidates the registration of the software as the execution-permitted software in the execution permission list by deleting an entry of the software whose rewriting is detected from the execution permission list.

3. The information processing device according to claim 1,
wherein each entry of the execution permission list includes a first flag,
the processing circuitry validates the first flag assigned to an entry of software that is successfully verified in the execution permission list, and
the processing circuitry permits the execution of the software when the first flag assigned to the entry of the software whose execution start is detected is valid in the execution permission list.

4. The information processing device according to claim 1,
wherein the processing circuitry invalidates the first flag assigned to the entry of the software whose rewriting is detected in the execution permission list.

5. The information processing device according to claim 1,
wherein the processing circuitry registers software which fails in the verification in the execution permission list and invalidates the first flag assigned to the entry of the software.

6. The information processing device according to claim 1,
wherein, when an execution start of software which is not registered in the execution permission list as the execution-permitted software is detected, the processing circuitry verifies integrity of the software, permits execution of the software if the verification is successfully performed, and registers the software in the execution permission list as the execution-permitted software.

7. The information processing device according to claim 1,
wherein the processing circuitry determines whether or not verification of the integrity of the software whose execution start is detected is performed based on a value of the first flag.

8. The information processing device according to claim 1,
wherein the processing circuitry performs verification of integrity of software corresponding to a predetermined condition among software registered in the whitelist.

9. The information processing device according to claim 8,
wherein each entry of the whitelist includes a second flag, and
the predetermined condition of the software to be verified is a condition that the software is a software registered in an entry in which the second flag is valid in the whitelists.

10. The information processing device according to claim 1,
wherein the timing which does not depend on the execution start of the software is a time at which the processing circuitry is activated.

11. The information processing device according to claim 1,
wherein the timing which does not depend on the execution start of the software is a time at which specific software different from the software is activated.

12. The information processing device according to claim 1,
wherein the timing which does not depend on the execution start of the software is a time at which the processing circuitry receives a specific signal.

13. The information processing device according to claim 1,
wherein, when an execution start of first software is detected while a process by the processing circuitry is being performed, the processing circuitry stops the process, and the processing circuitry verifies integrity of the first software and permits execution of the first software when the verification is successfully performed.

14. An information processing method executed by an information processing device, comprising:
verifying integrity of software registered in a whitelist at a predetermined timing which does not depend on an execution start of software and generating an execution permission list in which software which is successfully verified is registered as execution-permitted software;
permitting execution of the software when the execution start of the software is detected and the software is registered in the execution permission list as the execution-permitted software;
detecting rewriting of software; and
invalidating, when software whose rewriting is detected is registered in the execution permission list as the execution-permitted software, registration of the software as the execution-permitted software in the execution permission list.

15. A computer program product including a non-transitory computer-readable medium including a programmed instructions, wherein the instructions, when executed by a computer, cause the computer to perform:
verifying integrity of software registered in a whitelist at a timing which does not depend on an execution start of software and generates an execution permission list in which software which is successfully verified is registered as execution-permitted software;
permitting execution of the software when the execution start of the software is detected and the software is registered in the execution permission list as the execution-permitted software;

detecting rewriting of software; and invalidating, when software whose rewriting is detected is registered in the execution permission list as the execution-permitted software, registration of the software as the execution-permitted software in the execution permission list.

16. An information processing device, comprising:

processing circuitry configured to:

calculate a hash value of software registered in a whitelist at a timing which does not depend on an execution start of software and generate a hash value list;

permit execution of the software when the execution start of the software is detected, a hash value of the software is registered in the hash value list, and the hash value registered in the hash value list coincides with a hash value of the whitelist;

detect rewriting of software; and invalidate, when software whose rewriting is detected is registered in an execution permission list in which whitelist-registered software successfully verified for integrity is registered as execution-permitted software, registration of the software as the execution-permitted software in the execution permission list.

* * * * *